US011928083B2

(12) United States Patent
Vengerov et al.

(10) Patent No.: US 11,928,083 B2
(45) Date of Patent: Mar. 12, 2024

(54) DETERMINING COLLABORATION RECOMMENDATIONS FROM FILE PATH INFORMATION

(71) Applicant: Box, Inc., Redwood City, CA (US)

(72) Inventors: David Vengerov, San Jose, CA (US); Sesh Jalagam, Union City, CA (US); Victor De Vansa Vikramaratne, Sunnyvale, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/264,357

(22) Filed: Jan. 31, 2019

(65) Prior Publication Data
US 2019/0163671 A1    May 30, 2019

Related U.S. Application Data

(63) Continuation-in-part of application No. 16/136,196, filed on Sep. 19, 2018, which is a continuation-in-part
(Continued)

(51) Int. Cl.
*G06F 16/16* (2019.01)
*G06F 16/14* (2019.01)
(Continued)

(52) U.S. Cl.
CPC ............ *G06F 16/176* (2019.01); *G06F 16/14* (2019.01); *G06F 16/156* (2019.01);
(Continued)

(58) Field of Classification Search
CPC ........... G06N 7/005; G06N 5/02; G06N 5/00; G06N 3/08; G06N 5/04; G06N 7/01;
(Continued)

(56) References Cited

U.S. PATENT DOCUMENTS 7,039,642 B1 *  5/2006  Horvitz ................... G06F 16/10
7,669,123 B2    2/2010  Zuckerberg et al.
(Continued)

OTHER PUBLICATIONS

Final Office Action dated Mar. 13, 2020 for U.S. Appl. No. 16/136,196.
(Continued)

*Primary Examiner* — Jennifer N Welch
*Assistant Examiner* — Parmanand D Patel
(74) *Attorney, Agent, or Firm* — Vista IP Law Group, LLP

(57) ABSTRACT

Methods, systems and computer program products for recommendation systems. Embodiments commence by gathering a set of pathnames that refer to content objects of a collaboration system. A tokenizer converts at least some of the pathnames into vectors. The vectors comprise hierarchical path components such as folder names or file names, which vectors are labeled with an indication as to whether or not the folder or file referred to in a particular vector had been clicked on by one or more users. Some portion of the labeled vectors are used to train a predictive model. Another portion of the vectors are used to validate the predictive model. When the model exhibits sufficient precision and recall, the predictive model is then used to predict the probability that a particular user would have an interest in a particular folder or file. The folder name or file name is presented as a collaboration recommendation.

17 Claims, 11 Drawing Sheets

Related U.S. Application Data of application No. 15/728,486, filed on Oct. 9, 2017, now Pat. No. 11,030,223.

(60) Provisional application No. 62/723,961, filed on Aug. 28, 2018.

(51) Int. Cl.
  *G06F 16/176* (2019.01)
  *G06F 21/62* (2013.01)
  *G06N 5/02* (2023.01)

(52) U.S. Cl.
  CPC ........ *G06F 16/166* (2019.01); *G06F 21/6209* (2013.01); *G06N 5/02* (2013.01); *G06F 2221/2145* (2013.01)

(58) Field of Classification Search
  CPC .......... G06F 16/01; G06F 21/62; G06F 16/00; G06F 21/00; G06F 21/53; G06F 11/36; G06F 3/048; G06F 16/176; G06F 16/14; G06F 16/156; G06F 16/166; G06F 21/6209; G06F 2221/2145; G06F 11/3438; G06F 2201/86; G06Q 30/0254; G06Q 30/0255; G06Q 30/0269; G06Q 30/0631
  See application file for complete search history.

(56) References Cited

U.S. PATENT DOCUMENTS

| | | | |
|---|---|---|---|
| 8,381,306 B2 | 2/2013 | Mcpherson et al. | |
| 8,965,983 B2 | 2/2015 | Costenaro et al. | |
| 9,697,210 B1* | 7/2017 | Lee | G06F 11/3664 |
| 9,805,042 B1* | 10/2017 | Meyer | G06F 16/16 |
| 9,824,094 B1* | 11/2017 | Meyer | H04L 67/06 |
| 9,990,365 B1* | 6/2018 | Kilpatrick | G06F 16/119 |
| 10,074,015 B1 | 9/2018 | Grundmann | |
| 10,102,305 B1 | 10/2018 | Chang | |
| 10,218,784 B2 | 2/2019 | Ju | |
| 10,452,993 B1* | 10/2019 | Hart | G06N 20/00 |
| 10,997,499 B1* | 5/2021 | Kayyoor | G06N 20/00 |
| 2002/0069360 A1* | 6/2002 | Thoone | G11B 20/1217 |
| | | | 713/185 |
| 2002/0120734 A1 | 8/2002 | Riosa | |
| 2004/0054566 A1 | 3/2004 | J'Maev | |
| 2005/0010593 A1* | 1/2005 | Fellenstein | G06F 16/10 |
| 2005/0235318 A1 | 10/2005 | Grauch et al. | |
| 2006/0161543 A1 | 7/2006 | Feng | |
| 2007/0283443 A1 | 12/2007 | McPherson | |
| 2008/0077462 A1 | 3/2008 | Patel | |
| 2008/0183665 A1 | 7/2008 | Brinker | |
| 2008/0195587 A1* | 8/2008 | Hussami | G06F 16/367 |
| 2009/0164537 A1* | 6/2009 | Huang | G06F 16/13 |
| 2009/0248615 A1* | 10/2009 | Drory | G06F 16/16 |
| 2009/0276492 A1 | 11/2009 | Bobbitt et al. | |
| 2012/0192086 A1 | 7/2012 | Ghods | |
| 2012/0233096 A1* | 9/2012 | Gupta | G06F 16/951 |
| | | | 706/12 |
| 2012/0297313 A1 | 11/2012 | Sharma | |
| 2013/0124513 A1 | 5/2013 | Bignert et al. | |
| 2013/0179381 A1* | 7/2013 | Kawabata | G06F 16/1734 |
| | | | 706/46 |
| 2013/0179799 A1 | 7/2013 | Savage | |
| 2013/0262598 A1 | 10/2013 | Makanawala | |
| 2013/0297689 A1 | 11/2013 | Bhat | |
| 2013/0311467 A1 | 11/2013 | Galle et al. | |
| 2013/0318593 A1 | 11/2013 | Smith | |
| 2013/0332195 A1 | 12/2013 | Galuten | |
| 2014/0006977 A1 | 1/2014 | Adams | |
| 2014/0081904 A1 | 3/2014 | Sitrick | |
| 2014/0327622 A1 | 11/2014 | Ouyang | |
| 2015/0134693 A1 | 5/2015 | Chan | |
| 2015/0207701 A1* | 7/2015 | Faaborg | H04L 67/18 |
| | | | 709/224 |
| 2015/0331578 A1 | 11/2015 | Keslin | |
| 2015/0372855 A1 | 12/2015 | Kushmerick et al. | |
| 2016/0065627 A1 | 3/2016 | Pearl | |
| 2016/0098390 A1* | 4/2016 | Kitajima | G06F 40/205 |
| | | | 707/722 |
| 2016/0260336 A1 | 9/2016 | Chapman | |
| 2016/0321311 A1 | 11/2016 | Tallamraju | |
| 2016/0373476 A1 | 12/2016 | Dell'anno et al. | |
| 2017/0063818 A1 | 3/2017 | Niewczas et al. | |
| 2017/0139550 A1 | 5/2017 | Milvaney | |
| 2017/0168692 A1 | 6/2017 | Chandra | |
| 2017/0185687 A1 | 6/2017 | Pai et al. | |
| 2017/0277907 A1 | 9/2017 | Dang et al. | |
| 2017/0318020 A1 | 11/2017 | Kamath et al. | |
| 2017/0364568 A1 | 12/2017 | Reynolds et al. | |
| 2018/0032609 A1 | 2/2018 | Allen et al. | |
| 2018/0062852 A1 | 3/2018 | Schmahmann | |
| 2018/0081503 A1* | 3/2018 | Green | G06N 3/084 |
| 2018/0284959 A1 | 10/2018 | Alphin et al. | |
| 2018/0349623 A1* | 12/2018 | Morard | G06F 21/53 |
| 2019/0130031 A1 | 5/2019 | Gourley | |

OTHER PUBLICATIONS

Final Office Action dated Sep. 30, 2019 for U.S. Appl. No. 15/728,486.
Non-Final Office Action dated May 30, 2019 for U.S. Appl. No. 15/728,486.
Non-Final Office Action dated Nov. 1, 2019 for U.S. Appl. No. 16/136,196.
Non-Final Office Action dated Dec. 12, 2019 for U.S. Appl. No. 16/136,200.
Tata, Sandeep, et al. "Quick access: building a smart experience for Google drive." Proceedings of the 23rd ACm SIGKDD International Conference on Knowledge Discovery and Data Mining. ACM, 2017.
Notice of Allowance dated Jul. 27, 2020 for U.S. Appl. No. 16/136,200.
Final Office Action dated Nov. 9, 2020 for U.S. Appl. No. 16/136,207.
Non-Final Office Action dated Mar. 10, 2021 for U.S. Appl. No. 16/136,196.
Final Office Action dated Jul. 15, 2021 for U.S. Appl. No. 16/136,196.
Notice of Allowance dated May 13, 2021 for U.S. Appl. No. 16/136,207.
Non-Final Office Action for U.S. Appl. No. 16/136,207 dated Apr. 29, 2020.
Non-Final Office Action for U.S. Appl. No. 15/728,486 dated Jul. 28, 2020.
Non-Final Office Action for U.S. Appl. No. 16/136,196 dated Feb. 8, 2022.
Final Office Action for U.S. Appl. No. 16/136,196 dated Jun. 21, 2022.
Notice for Allowance for U.S. Appl. No. 16/136,196 dated Mar. 8, 2023.
Non-Final Office Action for U.S. Appl. No. 17/336,221, dated May 11, 2023.
Activity Stream —Wikipedia, URL:https://en.wikipedia.org/wiki/Activity_stream, Oct. 28, 2019.
Final Office Action dated Nov. 22, 2023 for U.S. Appl. No. 17/336,221.

* cited by examiner

DETERMINING COLLABORATION RECOMMENDATIONS FROM FILE PATH INFORMATION

RELATED APPLICATIONS

The present application is a continuation-in-part of and claims the benefit of priority to co-pending U.S. patent application Ser. No. 16/136,196 titled "PRESENTING COLLABORATION ACTIVITIES", filed on Sep. 19, 2018, which claims the benefit of priority to U.S. Provisional Patent Application Ser. No. 62/723,961 titled "PRESENTING COLLABORATION ACTIVITIES", filed on Aug. 28, 2018, and which is a continuation-in-part of U.S. patent application Ser. No. 15/728,486 titled "COLLABORATION ACTIVITY SUMMARIES", filed Oct. 9, 2017, all of which are hereby incorporated by reference in their entirety.

FIELD

This disclosure relates to recommendation systems, and more particularly to techniques for determining collaboration recommendations from file path information.

BACKGROUND

Many modern collaboration systems implement various techniques to present collaboration recommendations to the users. Such collaboration recommendations encourage the users to interact with content objects (e.g., files, folders, etc.) and/or with other users so as to enhance collaboration. For example, if user A shares file P with user B, and user B has also accessed file Q, then file Q might be recommended for access by user A. In this case, the recommendation to access file Q might be presented on a user device to enhance the experience of user A (e.g., to facilitate collaboration).

The foregoing technique relies on an assumption that since user A has collaborated with user B, user A has the same interests (e.g., in file Q) as does user B. In some modern collaboration systems, common interests of users are inferred from other user relationships as well. For example, if both user A and user C are members of the same department of an enterprise, it is reasonable to assume that at least some of the content objects that are of interest to user C would also be of interest to user A.

Unfortunately, forming content object recommendations based on assumed shared interests between users results in far too many recommendations—and often irrelevant recommendations—being presented to a user, many of which recommendations may not capture the true interests of the subject user. Specifically, in large, highly collaborative environments with numerous user-to-user interactions and user-content interactions, the number of recommendations presented to a particular user can become too large for human comprehension and/or for efficient browsing on a user device (e.g., on a mobile phone). The result of having such large sets of recommendations is a low likelihood that a user will take action on any of the recommendations. What is needed is a way to present content object collaboration recommendations that have a high likelihood of being acted upon.

SUMMARY

The present disclosure describes techniques used in systems, methods, and in computer program products for determining collaboration recommendations from file path information, which techniques advance the relevant technologies to address technological issues with legacy approaches. More specifically, the present disclosure describes techniques used in systems, methods, and in computer program products for determining content object collaboration recommendations based on user activity over content objects and corresponding file path information of such content objects. Certain embodiments are directed to technological solutions for forming a predictive model from the file path information associated with historical content object access activity.

The disclosed embodiments modify and improve over legacy approaches. In particular, the herein-disclosed techniques provide technical solutions that address the technical problems attendant to predicting a set of content objects that a user will most likely want to access. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for inter-component communication.

For example, when performing computer operations that address the various technical problems underlying predicting a set of content objects that a user will most likely want to access, both memory usage and CPU cycles demanded are significantly reduced as compared to the memory usage and CPU cycles that would be needed but for use of techniques for forming a predictive model from the file path information associated with historical content object access activity. Strictly as one example, use of the techniques disclosed herein serve to reduce both network usage and CPU cycles as compared to alternative approaches where users might click on many files or folders with "bad" recommendations, thereby uselessly consuming computing and network resources.

The ordered combination of steps of the embodiments serve in the context of practical applications that perform steps for forming a predictive model from the file path information associated with historical content object access activity more efficiently by reducing or eliminating consumption of resources that would be needed to present content object recommendations that a subject user is not likely to access. As such, techniques for forming a predictive model from the file path information associated with historical content object access activity overcome longstanding yet unsolved technological problems associated with predicting a set of content objects that a user will most likely want to access that arise in the realm of computer systems.

Many of the herein-disclosed embodiments for forming a predictive model from the file paths associated with historical content object access activity are technological solutions pertaining to technological problems that arise in the hardware and software arts that underlie collaboration systems. Aspects of the present disclosure achieve performance and other improvements in peripheral technical fields including (but not limited to) human-machine interfaces and machine learning. More specifically, human-machine interfaces are disclosed that recommend objects that are in folders at particular hierarchical locations.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
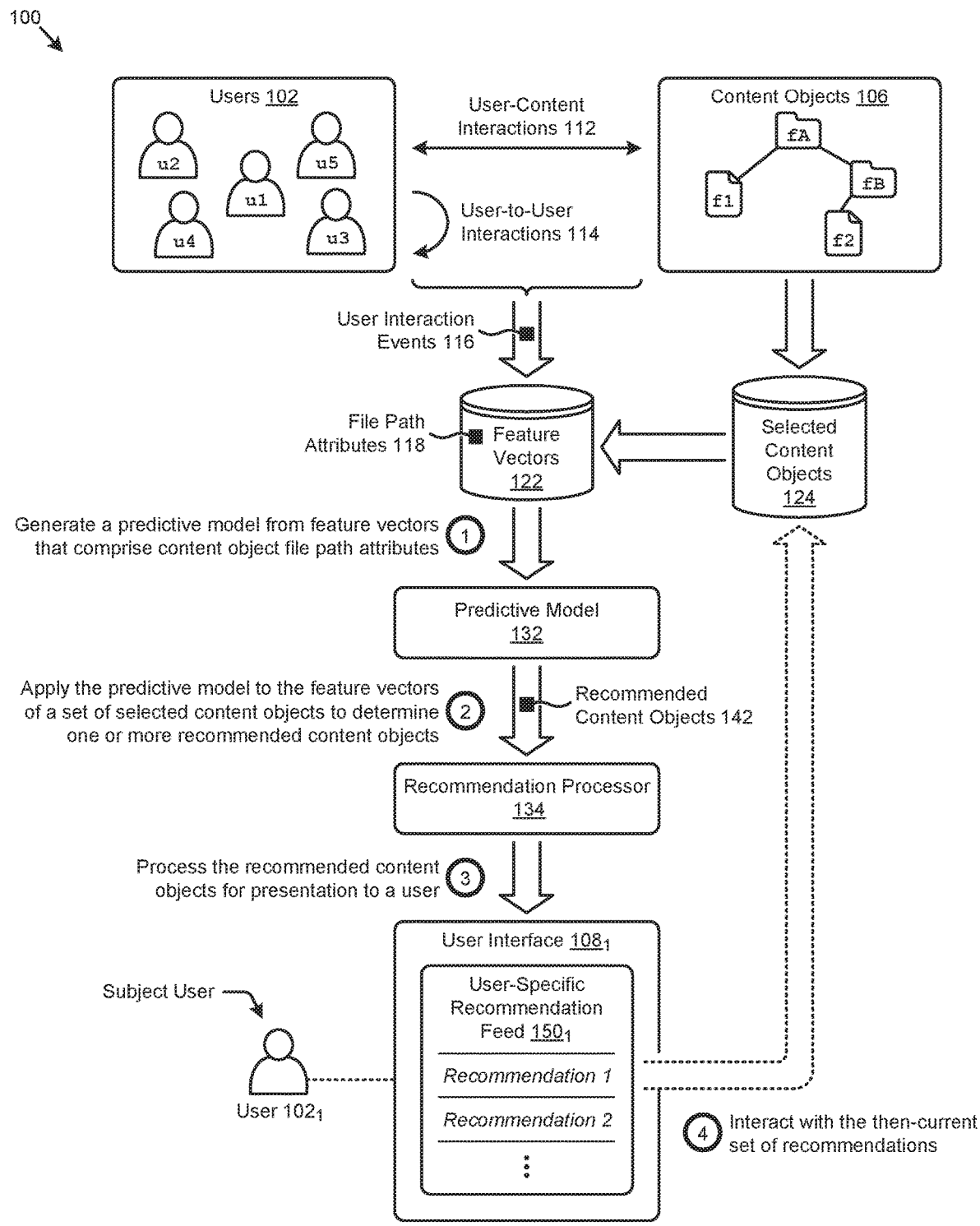
FIG. 1 presents a computing environment in which embodiments of the present disclosure can be implemented, according to an embodiment.

Aspects of the present disclosure solve problems associated with using computer systems for predicting a set of content objects that a user will most likely want to access. These problems are unique to, and may have been created by, various computer-implemented methods for predicting content objects that a user will most likely want to access in the context of collaboration systems. Some embodiments are directed to approaches for forming a predictive model from the file path information associated with historical content object access activity. The accompanying figures and discussions herein present example environments, systems, methods, and computer program products for determining content object collaboration recommendations from file path information of content objects. The disclosed techniques derive at least in part from the discovery that file path information is indeed useful in accurately predicting likelihood of an action on a file or folder. The discovery itself, and proof of the usefulness of path information in accurately predicting likelihood of an action derives from analysis of empirical data.

Overview

Disclosed herein are techniques for forming a predictive model from the file path information associated with historical content object access activity to determine content object collaboration recommendations. In certain embodiments, a collaboration system that manages a set of content objects accessed by a plurality of users is identified. The content objects (e.g., files, folders, etc.) each have respective file paths comprising file path attributes that describes the logical path to the storage location of the corresponding content object. For example, an "overview.pptx" file might have a file path of "/marketing/strategy/" and "marketing" and "strategy" might be considered file path attributes of the "overview.pptx" file. As further disclosed herein, the information and/or attributes of the file path is used to form a predictive model. The resulting predictive model predicts the probability that a user will click on a certain content object based at least in part on its file path information.

The file path information from a user-specific set of content objects associated with a particular user is then applied to the predictive model so as to determine content objects to recommend to the user. In certain embodiments, feature vectors are generated from the file path information (e.g., file path attributes) to form the predictive model. In certain embodiments, the user-specific set of content objects is derived from a recommendation feed (e.g., based at least in part on common interests) created for a particular user. In certain embodiments, the recommendations produced by the predictive model are scored and/or sorted for presentation to the user. In certain embodiments, other information, such as topics extracted from the content objects, are combined with the file path information in the set of feature vectors that are used to form the predictive model.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 presents a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to forming a predictive model from the file path information associated with historical content object access activity. Specifically, the figure presents a logical depiction of how the herein disclosed techniques can be used in a computing environment to determine user-specific content object interaction recommendations by applying certain file path attributes of a set of content objects to the predictive model.

The logical depiction of FIG. 1 illustrates a selected set of users (e.g., user "u1", user "u2", user "u3", user "u4", and user "u5") from a plurality of users 102 that interact with each other through instances of user-to-user interactions 114. For example, a first user might invite a second user to collaborate on some task, and/or might request to join a group of other users. A user-to-user interaction may also be based on implicit user-to-user relationships (e.g., based on organizational structures). Any of users 102 might also invoke certain instances of user-content interactions 112 with various instances of content objects 106 (e.g., folder "/fA", file "f1", folder "/fB", and file "f2"). As an example, a first user might create a document and then share the document with other users for viewing, editing, or commenting by the other users. For a user-to-user interaction the "collaboration object" is another user, whereas for a user-content interaction the "collaboration object" is a content object.

The efficiency, productivity, and creativity of users 102 can be enhanced by knowledge of the user interaction events that correspond to the foregoing collaboration activities (e.g., user-content interactions 112, user-to-user interactions 114) as performed by other users. Based on the knowledge of such user interaction events, a particular user might be compelled to initiate a new user interaction event that is beneficial to the members of a particular collaboration group.

Indications of user interaction events sometimes take the form of collaboration recommendations that are presented to users 102 to encourage the users to interact with content objects (e.g., files, folders, etc.) and/or with other users so as to enhance their collaboration. For example, certain collaboration recommendations presented to a particular subject user (e.g., user $102_1$) might show that several colleagues (e.g., other users in the same department) have been editing a certain content object (e.g., a PowerPoint presentation) over the past several days. In some embodiments, the activity listings are organized for presentation at a user interface $108_1$ associated with the subject user in a user-specific recommendation feed $150_1$.

A user-specific recommendation feed is a sequence of user-specific recommendation messages that characterize one or more user interaction events. Specifically, a first user-specific recommendation message might describe a single user interaction event (e.g., "Lisa edited the file named overview.pptx"), while a second user-specific recommendation message might comprise a message that summarizes multiple user interaction events (e.g., "Bob and 3 others viewed the file named specification.docx"). As indicated in the foregoing examples, a user-specific recommendation message most often is associated with a particular content object that, when accessed by a subject user, is expected to enhance the efficiency, productivity, and creativity of the subject user.

As earlier mentioned, however, certain techniques for forming content object recommendations can result in far too many recommendations being presented to a subject user, many of which recommendations may not capture the true interests of the subject user. Specifically, in large, highly collaborative environments with numerous instances of user-to-user interactions 114 and user-content interactions 112, the number of recommendations presented to a particular subject user can become too large for human comprehension and/or for efficient browsing on a user device (e.g., on a mobile phone). Often, the result of having such large sets of recommendations is a low likelihood that a user will take action on any of the recommendations. Moreover, even if sorting or filtering techniques are used to decrease the size of the sets of recommendations, users really want "better" (i.e., more relevant recommendations) rather than just smaller sets of recommendations.

The herein disclosed techniques address the foregoing problems attendant to predicting a set of content objects that a user will most likely want to access by forming a predictive model from the file path information associated with historical user-content interactions to determine a set of recommended content objects that are processed for presentation to the user. Such file path information comprises a set of file path attributes that are associated with each respective content object in content objects 106. Specifically, the file path attributes for a particular content object describe the logical path to the storage location of the content object. For example, the aforementioned "overview.pptx" file might have a file path of "/marketing/strategy/" and "marketing" and "strategy" might be considered file path attributes of the "overview.pptx" file.

As further disclosed herein, instances of file path attributes 118 associated with a certain set of content objects 106—and various information associated with user interaction events 116 (e.g., who interacted with what content objects) associated with the set of content objects—are combined in a set of feature vectors 122 that are used to form a predictive model 132. A predictive model as used herein is a collection of mathematical techniques (e.g., algorithms) that facilitate determining (e.g., predicting) a set of outputs (e.g., outcomes, responses) based on a set of inputs (e.g., stimuli). For example, predictive model 132 might consume feature vectors associated with one or more selected content objects 124 to determine a probability (e.g., a "click probability") that a particular user will access a content object from the selected content objects 124.

In some cases, the techniques implemented by predictive model 132 might comprise a set of equations having coefficients that relate one or more of the input variables to one or more of the output variables. In these cases, the equations and coefficients comprise a set of model parameters that can be determined by a training and validation process. More specifically, the file path attributes of a first set of selected content objects 124 (e.g., the entire corpus of an enterprise's content objects) and a corresponding set of user interaction events 116 might be combined in a first set of feature vectors 122 to generate the predictive model 132 (operation 1). The file path attributes of a second set of selected content objects 124 (e.g., content objects associated with user $102_1$) are then applied to predictive model 132 to determine one or more recommended content objects 142 (operation 2).

The recommended content objects 142 are processed by a recommendation processor 134 for presentation to a particular subject user (operation 3). For example, recommended content objects 142 might be sorted and/or ranked (i.e., recommendation 1, recommendation 2, etc.) according to the click probability determined by predictive model 132, then presented to user $102_1$ in user-specific recommendation feed $150_1$ at user interface $108_1$. The user interacts with the user-specific recommendation feed by clicking on one or more entries that are of interest to the subject user. In some cases, characteristics of the subject user's interactions with the entries of interest (e.g., clicks and corresponding file path attributes of the then-current recommended content objects) can be recorded in the selected content object dataset (operation 4). In some cases, characteristics of the subject user's interactions with the entries of interest are incorporated into and/or applied to predictive model 132, which in turn serves to further improve the relevance of recommendations presented to the user.

One embodiment of techniques for determining content object collaboration recommendations is disclosed in further detail as follows.

Figure 2:
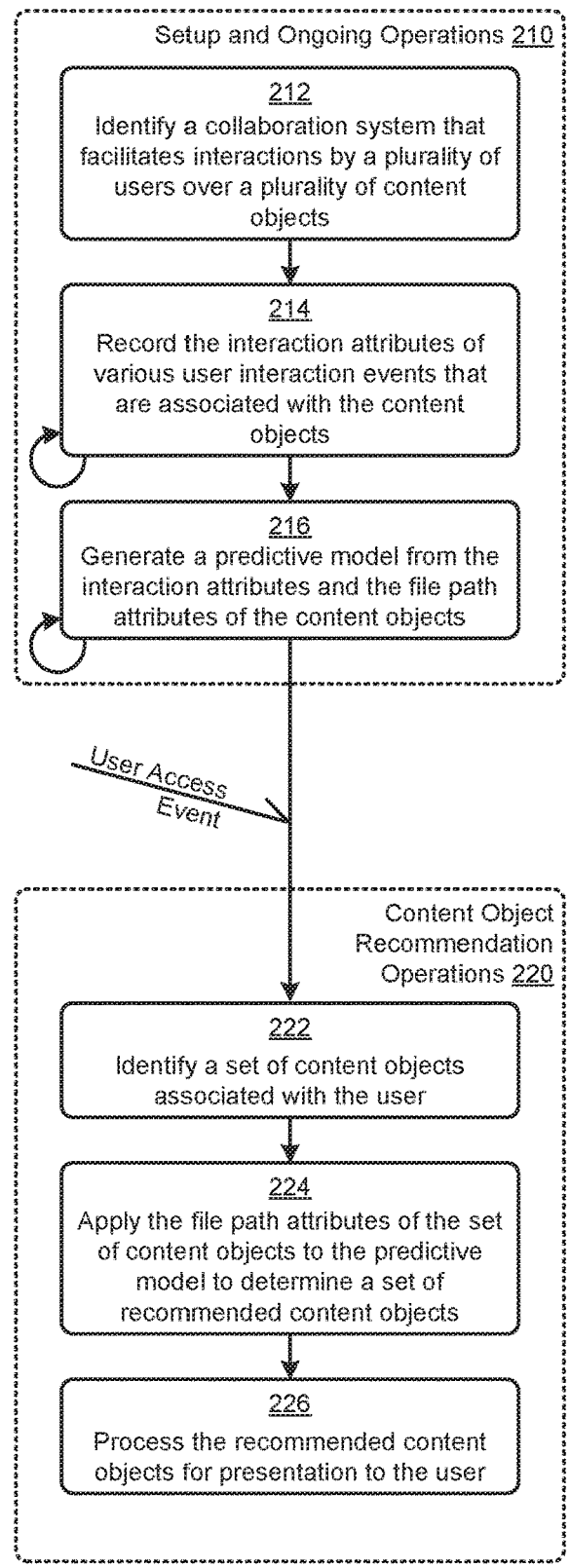
FIG. 2 depicts a collaboration recommendation technique as implemented in systems that determine content object collaboration recommendations from file path information of content objects, according to an embodiment.

FIG. 2 depicts a collaboration recommendation technique 200 as implemented in systems that determine content object collaboration recommendations from file path information of content objects. As an option, one or more variations of collaboration recommendation technique 200 or any aspect thereof may be implemented in the context of the architecture and functionality of the embodiments described herein. The collaboration recommendation technique 200 or any aspect thereof may be implemented in any environment.

FIG. 2 illustrates aspects pertaining to forming a predictive model from the file path information associated with historical content object access activity. Specifically, the figure is presented to illustrate one embodiment of certain steps and/or operations performed over a network of devices (e.g., user devices, collaboration servers, etc.) to generate user-specific content object collaboration recommendations that are likely to be followed by the subject user. As can be observed, the steps and/or operations can be grouped into a set of setup and ongoing operations 210 and a set of content object recommendation operations 220.

The setup and ongoing operations 210 of collaboration recommendation technique 200 commence by identifying a collaboration system that facilitates interactions by a plurality of users over a plurality of content objects (step 212). As earlier described, users that have access to the collaboration system might interact with each other in instances of user-to-user interactions and/or might interact with various content objects (e.g., files, folders, etc.) managed by the system in instances of user-content interactions. The user interaction events associated with the content objects at the system (e.g., user-content interactions) are recorded (step 214).

As used herein, user interaction events are operations that are observed to have been performed by a user or by the system over one or more content objects.

Such user interaction events can be observed and stored continuously as users interact with content objects. As an example of such, interaction attributes associated with ongoing user interaction events might be stored in a stream of objects. Constituents of such a stream of objects might include a timestamp as well as characterizations of the specific observed user actions (e.g., create, edit, view, preview, navigate, share, etc.) that have been taken on a particular content object (e.g., file, folder, etc.). In some cases, the mere touching or opening a folder is observable, and in some cases touching or opening a folder raises a corresponding interaction event.

As illustrated in the figure, the recording of user interaction events is an ongoing operation. The recorded interaction attributes and the file path attributes of the content objects are accessed to generate a predictive model (step 216). Step 216 may be performed periodically to keep the predictive model up to date with incoming user interaction events that had been recorded at step 214.

As earlier mentioned, the interaction attributes and the file path attributes might be organized into a set of feature vectors that are used to form a predictive model that can predict a click probability of a particular content object based at least in part on the file path attributes of the content object.

The content object recommendation operations 220 of collaboration recommendation technique 200 are performed at any moment in time. In some embodiments, content object recommendation operations 220 are initiated whenever a user accesses the collaboration system. In one embodiment, content object recommendation operations 220 commence by identifying a particular set of content objects associated with a particular user (step 222). For example, a filtering technique that evaluates the user's associations with various content objects and/or other users might be applied to identify the set of content objects. As another example, the set of content objects might be derived from a "default" recommendation feed presented to the user by the collaboration system.

The file path attributes of the set of content objects are applied to the predictive model so as to determine a set of recommended content objects (step 224). As merely one example, the predictive model might facilitate assignment of a click probability to each of the set of content objects so that the content objects with the highest click probability can be selected as the recommended content objects. The recommended content objects are then processed for presentation to the user (step 226). For example, recommendation messages that correspond to each of the recommended content objects might be generated for presentation in a user interface accessible by the user.

One embodiment of a system for implementing the content object collaboration recommendation technique of FIG. 2 is disclosed as follows.

Figure 3:
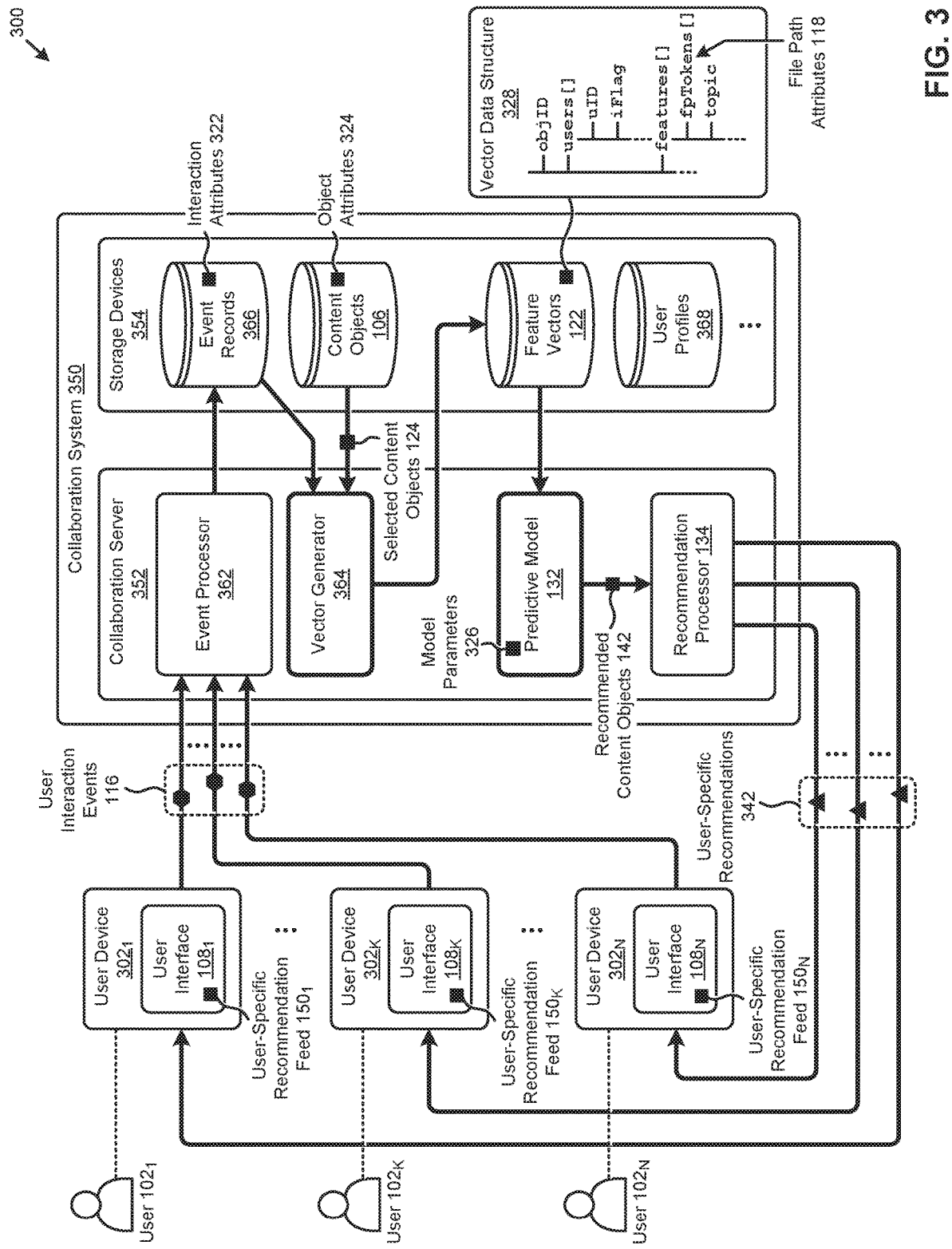
FIG. 3 is a block diagram of a system that forms content object collaboration recommendations from file path information, according to an embodiment.

FIG. 3 is a block diagram of a system 300 that forms content object collaboration recommendations from file path information. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to forming a predictive model from the file path information associated with historical content object access activity. Specifically, the figure is being presented to show one embodiment of certain representative components, data structures, and associated data flows that describe how the herein disclosed techniques might be implemented in a computing system. The components, data structures, and data flows shown in FIG. 3 present one partitioning and associated data manipulation approach. The specific example shown is purely exemplary, and other subsystems, data structures, and/or partitionings are reasonable.

As shown, system 300 comprises an instance of predictive model 132 and recommendation processor 134 earlier described operating at an instance of a collaboration server 352 in a collaboration system 350. A plurality of instances of the foregoing components might operate at a plurality of instances of the collaboration server 352 in the collaboration system 350 and/or any portion of system 300. Such instances can access a set of storage devices 354 that store various information that facilitates operation of system 300 and/or implementation of the herein disclosed techniques. For example, the collaboration server 352 might facilitate access to shared content in content objects 106 by a plurality of users (e.g., user $102_1$, . . . , user $102_K$, . . . , user $102_N$) from a respective set of user devices (e.g., user device $302_1$, . . . , user device $302_K$, . . . , user device $302_N$). The objects (e.g., files, folders, etc.) in content objects 106 are characterized at least in part by a set of object attributes 324 (e.g., content object metadata) stored at storage devices 354. Specifically, object attributes 324 can comprise file path attributes associated with content objects 106. Furthermore, the users are characterized at least in part by a set of user attributes stored in a set of user profiles 368 at storage devices 354.

In some cases, the users can interact with user interfaces or application workspaces (e.g., user interface $108_1$, . . . , user interface $108_K$, . . . , user interface $108_N$) at the user devices to invoke the user interaction events 116 at system 300. An event processor 362 at collaboration server 352 can detect the user interaction events 116 invoked by the plurality of users. Event processor 362 can codify certain interaction attributes 322 pertaining to user interaction events 116 within a set of event records 366 stored in storage devices 354. In some cases, event processor 362 will access the user attributes (e.g., user identifiers, etc.) stored in user profiles 368 and/or object attributes 324 (e.g., content object identifiers, etc.) stored in content objects 106 to facilitate populating the event records 366.

In accordance with the herein disclosed techniques, interaction attributes 322 of event records 366 and/or object attributes 324 (e.g., file path attributes) of sets of selected content objects 124 from content objects 106 and/or other information at collaboration system 350 are accessed by a vector generator 364 to generate instances of feature vectors 122.

The feature vectors 122 and/or any other data described herein can be organized and/or stored using various techniques. For example, a vector data structure 328 associated with feature vectors 122 indicate that the feature vector data might be organized and/or stored in a tabular structure (e.g., relational database table) that has rows that relate various features with a particular content object. As another example, the feature vector data might be organized and/or stored in a programming code object that has instances corresponding to a particular content object and properties corresponding to the various features associated with the content object.

As depicted in vector data structure 328, a data record (e.g., table row or object instance) for a particular content object might describe an object identifier (e.g., stored in an "objID" field), a list of users that might interact with the content object (e.g., stored in a "users[ ]" object), an array of features associated with the content object (e.g., stored in a "features[ ]" object), and/or other vector data. As further shown, each instance of the "users[ ]" object might describe a user identifier (e.g., stored in a "uID" field), an indication of interactions the user may have had with the content object (e.g., stored in an "iFlag" field), and/or other user attributes. As an example, a "1" in the "iFlag" field might indicate a user has interacted with (e.g., clicked on, previewed, edited, shared, etc.) the content object, and a "0" in the "iFlag" field might indicate the user has not interacted with the content object. In some cases, the "iFlag" field might be a vector that corresponds to many different types of interactions, each of which individual type or occurrence of interaction can be associated with a user response. More specifically, the "iFlag" field might be a vector that holds many aspects of many different types of interaction events.

In some cases, the "iFlag" field can hold a binary value that indicates at least some type of interaction, while being agnostic to any particular type of interaction (e.g., agnostic as to whether or not a user has previewed the content object, agnostic as to whether or not a user has edited the content object, agnostic as to whether or not a user has shared the content object, etc.).

Also as depicted in vector data structure 328, each instance of the "features[ ]" object might describe file path tokens (e.g., stored in a "fpTokens[ ]" field), a content object topic (e.g., stored in a "topic" field), and/or other features associated with the content object. For example, a file path "/A/B/" associated with a file "f2" might be tokenized (e.g., by a tokenizer module) to establish a feature "A" and a feature "B" for the file (e.g., "objID=f2"). As indicated in the figure, the tokenized file path information stored in the instances of the "fpTokens[ ]" field comprise the file path attributes. In some cases, certain topics extracted from a content object can be combined with the file path attributes of the content object to form a feature vector for the content object.

A first portion of feature vectors 122 are accessed to establish a set of model parameters 326 that characterize the predictive model 132. For example, the first portion of feature vectors 122 might correspond to a first set of selected content objects 124 that comprise content objects accessed by the most active users of an enterprise. A second portion of feature vectors 122 are then applied to predictive model 132 to determine sets of recommended content objects 142. Specifically, a certain portion of feature vectors corresponding to selected content objects associated with each user (e.g., subject user) might be applied to predictive model 132 to determine user-specific instances of recommended content objects 142.

Recommendation processor 134 processes the recommended content objects 142 to generate instances of user-specific recommendations 342 that are delivered to user-specific recommendation feeds (e.g., user-specific recommendation feed $150_1$, . . . , user-specific recommendation feed $150_K$, . . . , user-specific recommendation feed $150_N$) of the respective subject users.

Figure 4A:
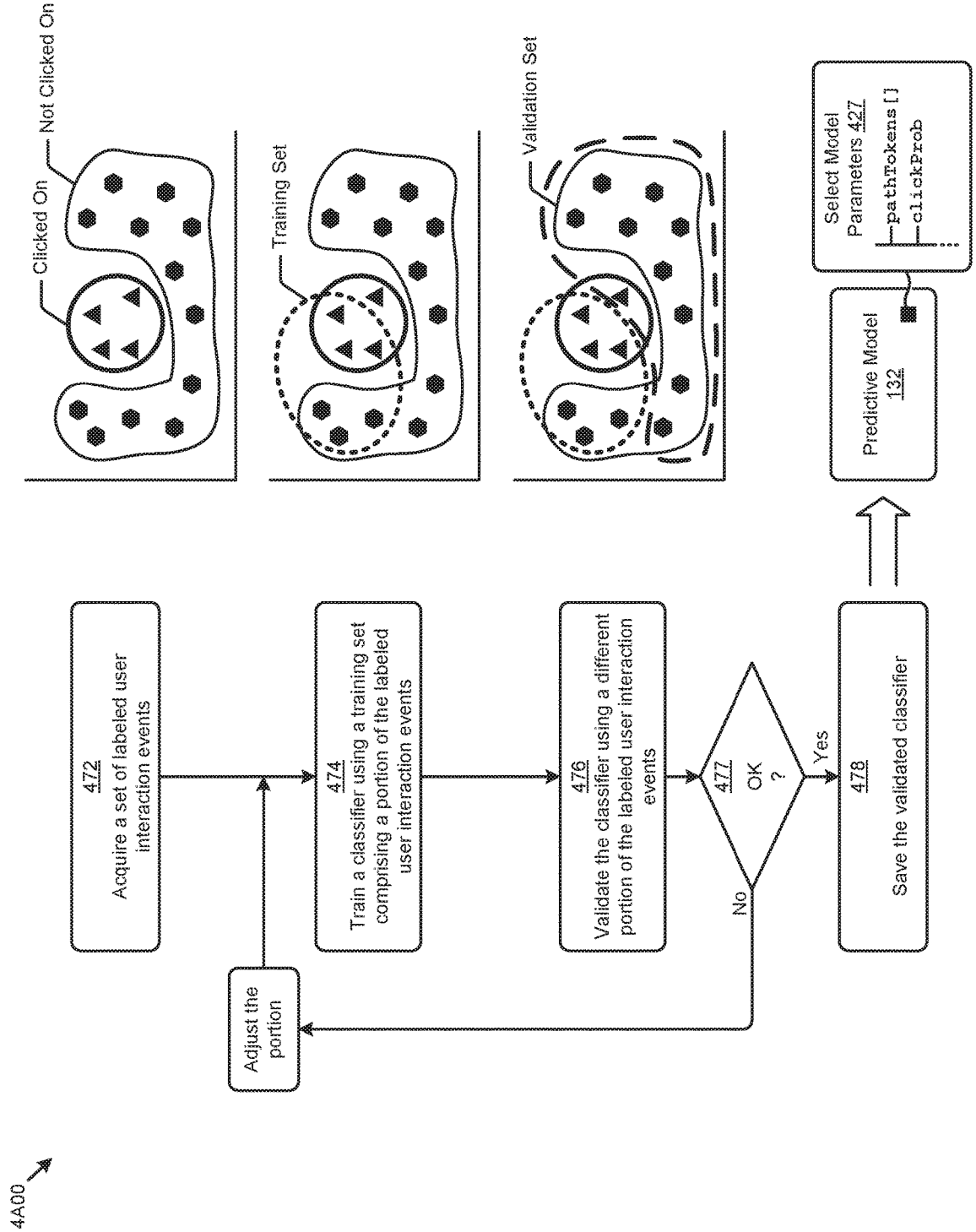
FIG. 4A and FIG. 4B present predictive model generation techniques as implemented in systems that determine content object collaboration recommendations from file path information, according to an embodiment.
Figure 4B:
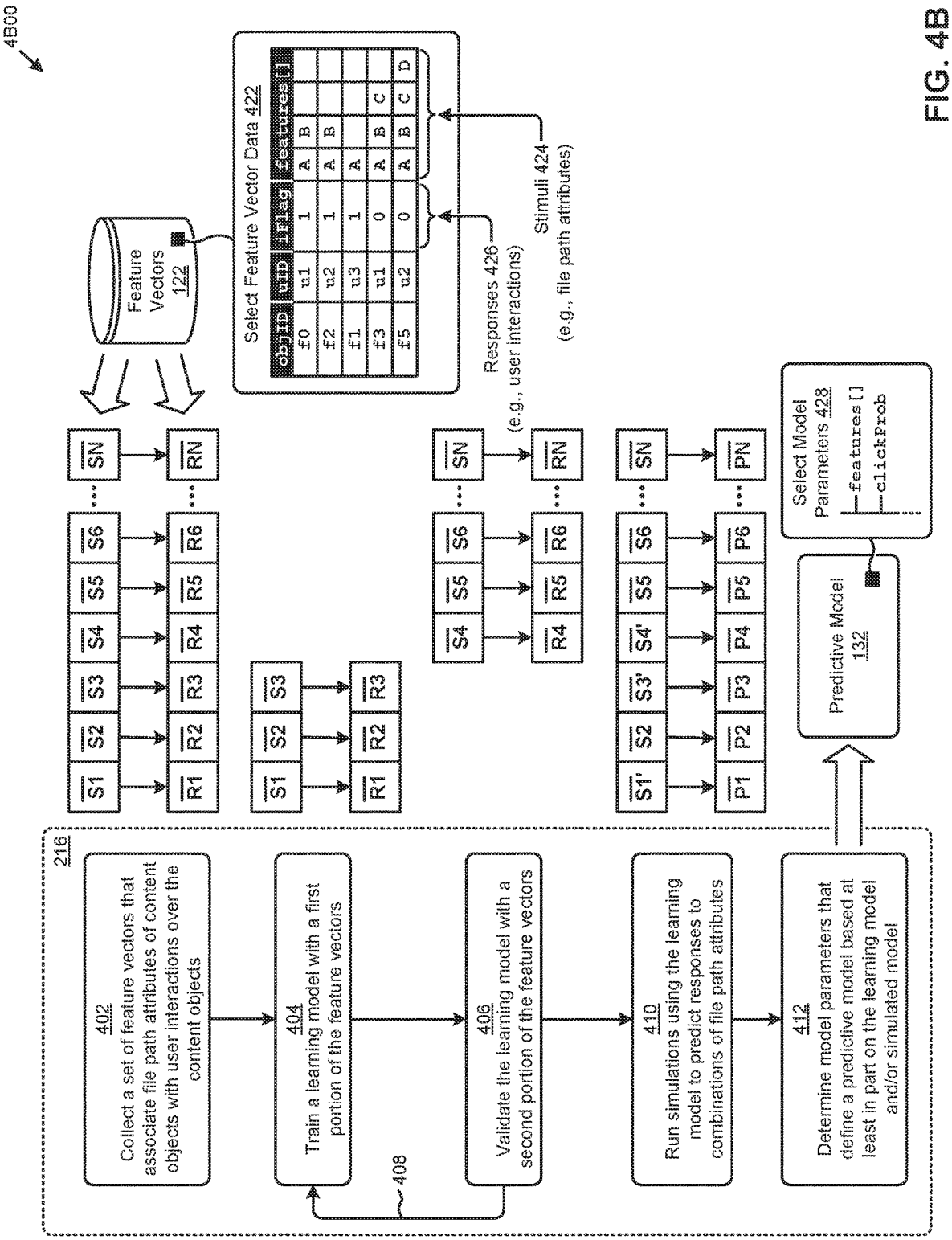

The foregoing discussions include techniques for generating a predictive model based at least in part on interaction attributes and/or file path attributes associated with various content objects (e.g., step 216 of FIG. 2), which techniques are disclosed in further detail as pertains to FIG. 4A and FIG. 4B.

FIG. 4A presents a predictive model generation technique 4A00 as implemented in systems that determine content object collaboration recommendations from file path information. As an option, one or more variations of predictive model generation technique 4A00 or any aspect thereof may be implemented in the context of the architecture and functionality of the embodiments described herein. The predictive model generation technique 4A00 or any aspect thereof may be implemented in any environment.

The shown technique trains a classifier, which classifier serves as a predictive model 132. The predictive model outputs a likelihood of a user's interaction (e.g., click probability) based on constituents of the file path (e.g., path tokens). Initially (step 472) a set of labeled user interaction events are assembled. These labeled user interaction events include at least a file path and an indication as to whether or not that file had been clicked on by users at some point after creation of the file. The set may comprise files that have a creation date in a recent time period.

For training purposes, the set of labeled user interaction events includes at least some files that had been click on, and at least some files that had not been clicked on. This set is used to train a classifier (step 474). The classifier can be of any known type of classifier. In some cases, the classifier is a random forest classifier, where the classifier is composed of a multitude of decision trees that are formed during training time. Such a classifier traverses many individual decision trees to determine a mean prediction based on the predictions of the many individual trees.

After training such a classifier with a training set selected from the set of labeled user interaction events on files, the classifier can then be used to predict the probability (e.g., the shown "clickkProb" of select model parameters 427) of the user interaction on a particular file. In this embodiment, the file path is decomposed into path tokens (e.g., the shown "pathTokens[ ]"), and decision trees in the random forest are based on each token. For example, for a file path of "/AB/filename", where "A", and "B" are folders, a decision tree is created for the likelihood that a user would click on a file that is somewhere in the sub-hierarchy of folder "A", and a different decision tree is created for the likelihood that a user would click on a file that is somewhere in the sub-hierarchy of folder "B", and so on, down to the file itself. The parameters shown in the select model parameters 427 are merely example parameters. Other parameters that are deemed to be useful for classification and/or prediction are possible. For example, the select model parameters 427 might include a timestamp or an indication of the owner of the file, etc.

Various performance metrics are applied to the generated classifier. Specifically, classifier validation (step 476) can be performed over the trained classifier that was generated in step 474. As shown, a validation set that is different from the training set is used for validations. In some cases, the values of the aforementioned performance metrics are unsatisfactory (e.g., there is insufficient precision and/or insufficient recall metrics), in which case, the "No" branch of decision 477 is taken, which causes an adjustment of the portion of the set selected from the set of labeled user interaction events on files that are used as the training set. However, if the values of the aforementioned performance metrics are satisfactory (e.g., there is sufficient precision and/or sufficient recall metrics), the "Yes" branch of decision 477 is taken. At step 478, the validate classifier is saved and used as the shown predictive model 132.

Based on an input (e.g., a folder by folder pathname and/or filename of a content object) the decision trees of the predictive model 132 can be traversed so as to calculate probabilities of a click on a folder or file, which probabilities are in turn used to make a recommendation of a content object. The foregoing is merely one technique for making recommendations to a particular user.

FIG. 4B presents another predictive model generation technique 4B00 as implemented in systems that determine content object collaboration recommendations from file path information. As an option, one or more variations of predictive model generation technique 4B00 or any aspect thereof may be implemented in the context of the architecture and functionality of the embodiments described herein. The predictive model generation technique 4B00 or any aspect thereof may be implemented in any environment.

FIG. 4B presents a predictive model generation technique 4B00 as implemented in systems that determine content object collaboration recommendations from file path information. As an option, one or more variations of predictive model generation technique 4B00 or any aspect thereof may be implemented in the context of the architecture and functionality of the embodiments described herein. The predictive model generation technique 4B00 or any aspect thereof may be implemented in any environment.

FIG. 4B illustrates aspects pertaining to forming a predictive model based on file path information associated with historical content object access activity. Specifically, the figure is presented to illustrate one embodiment of certain steps and/or operations for generating a predictive model to predict the probability that a user will access a recommended content object based at least in part on the file path attributes associated with the content object. As depicted in the figure, the steps and/or operations are associated with step 216 of FIG. 2. A representative scenario is also shown in the figure to illustrate an example application of predictive model generation technique 4B00.

Predictive model generation technique 4B00 commences with forming a set of content objects. There are many ways to form such a set. For example, a set of content objects with associated attributes might be selected based on a particular time or time period. Additionally, or alternatively, such a set might be formed and/or filtered based on aspects pertaining to creation of the content objects (e.g., based on a date/time stamp of the original creation, or based on date/time stamp of a sharing event, or based on a date/time stamp of a collaborator's modification, or based on an enterprise name or other organizational affiliation of collaborators, etc.). Then, based at least in part on the foregoing set, feature vectors that associate file path attributes to corresponding content objects are generated. The feature vectors may include indications of the presence of or absence of user interactions over corresponding content objects (step 402).

In some cases, the set of content objects may be selected based on a recent time period. As such, the file path information of the selected files is associated with historical content object access activity. More specifically, in many embodiments, a particular file is associated (e.g., labeled) with an indication of the type or types of user interaction that had been observed during the recent time period.

This technique employs a stimulus/response predictive technique. Specifically, the presence of a file in at least one location that can be clicked on by at least one user serves as the stimulus in the stimulus/response model. The observation that some user did or did not click on that file serves as the response in this stimulus/response model.

More specifically, and as depicted in the shown set of select feature vector data 422 from feature vectors 122, the file path attributes (e.g., stored in "features[ ]" objects) represent sets of stimuli 424 that correspond to respective instances of user interaction responses (e.g., responses 426).

For example, user "u2" interacts (e.g., "iFlag=1") with a file "f2" having file path attributes "A" and "B", but does not interact (e.g., "iFlag=0") with file "f5" having a file path attributes of "A", "B", "C", and "D". Also, in this scenario, user "u3" interacts (e.g., "iFlag=1") with a file "f1" having file path attribute "A", but does not interact with other files. The scenario also shows that user "u1" does interact with file "f0" at file path of "A" and "B", but user "u1" does not interact with file "f3" at path "A", "B", and "c". The predictive model generated from feature vectors that comprise individual file path components (e.g., folder names) as vector features exhibits higher precision and recall as compared with predictive models that instead use the file path string as a single feature in the vector.

As illustrated in the scenario of FIG. 4B, the foregoing sets of file path attributes from feature vectors 122 are represented by stimulus vectors $\overline{S1}$ through $\overline{SN}$ and the corresponding user interactions from feature vectors 122 are represented by response vectors $\overline{R1}$ through $\overline{RN}$.

The stimuli-response pairs (e.g., pairs $\overline{S1}$-$\overline{R1}$ through $\overline{S3}$-$\overline{R3}$) from a first portion of the feature vectors are used to train one or more learning models (step 404). The stimuli-response pairs (e.g., pairs $\overline{S4}$-$\overline{R4}$ through $\overline{SN}$-$\overline{RN}$) from a different portion of the feature vectors are used to validate the learning model (step 406). The processes of training and validating a learning model can be an iterated process in a loop (see path 408), which iterations continue until the learning model behaves within target tolerances (e.g., with respect to predictive statistic metrics, descriptive statistics, significance tests, etc.). In some cases, additional feature vectors can be collected (e.g., from feature vectors 122) to further train the learning model.

When a learning model is established, simulations are run that apply file path attribute variations to the learning model so as to generate predicted responses to the varying stimuli (step 410). As shown in FIG. 4B, selected varied stimulus vectors (e.g., stimulus vectors $\overline{S1'}$, $\overline{S3'}$, and $\overline{S4'}$) might be applied with other unvaried stimuli to the learning model so as to determine a set of predicted responses (e.g., predicted response vectors $\overline{P1}$ through $\overline{PN}$). By simulating a certain set of combinations of varied stimuli, a simulated model can be generated for a predictive model that serves to capture the full range of file path attribute variations in a particular collaboration system.

Model parameters that define a predictive model are determined based at least in part on the learning model and/or simulated model (step 412). As an example, model parameters that characterize the predictive model 132 earlier described might be generated by predictive model generation technique 4B00. As depicted in a set of select model parameters 428, such model parameters associated with predictive model 132 might associate a click probability (e.g., stored in a "clickProb" field) with a set of file path attributes and/or other attributes (e.g., stored in a "features[ ]" object). For example, and as shown in the select feature vector data 422, the "features[ ]" object might include hierarchical path components, where each entry in the "features[ ]" object is a representation of a level of a hierarchy. For example, a pathname of "/A/B/C/D/" that describes the folder where file "f5" is stored can be decomposed (e.g., by a tokenizer module) into a feature for "A", a feature for "B", a feature for "C", and a feature for "D". Moreover, since each folder that occurs in a pathname is represented as an occurrence of a distinct feature in the feature vector, such an occurrence influences the click probability on the folder.

In some cases, a particular filename may occur in multiple folders. For example, the file of name "X.txt" might occur in folder "/A", whereas another file with name "X.txt" might occur in folder "/A/B/C/D/". As such, the click probability corresponding to the file "X.txt" in folder "/A" may be different from the click probability corresponding to the file "X.txt" in folder "/A/B/C/D/".

The foregoing are merely examples based on folder features, however in many cases the features include information in addition to the decomposed pathnames. Strictly as one example such information in addition to a particular decomposed pathname might include a creation time of the content object, a modification time of the content object, or an ordering indication. The ordering indication can serve to distinguish folder "/A/B/". from folder "/B/A/".

Further details pertaining to techniques for applying the file path attributes of a set of content objects to a predictive model so as to determine a set of recommended content objects (step 224 of FIG. 2) are disclosed as follows.

Figure 5:
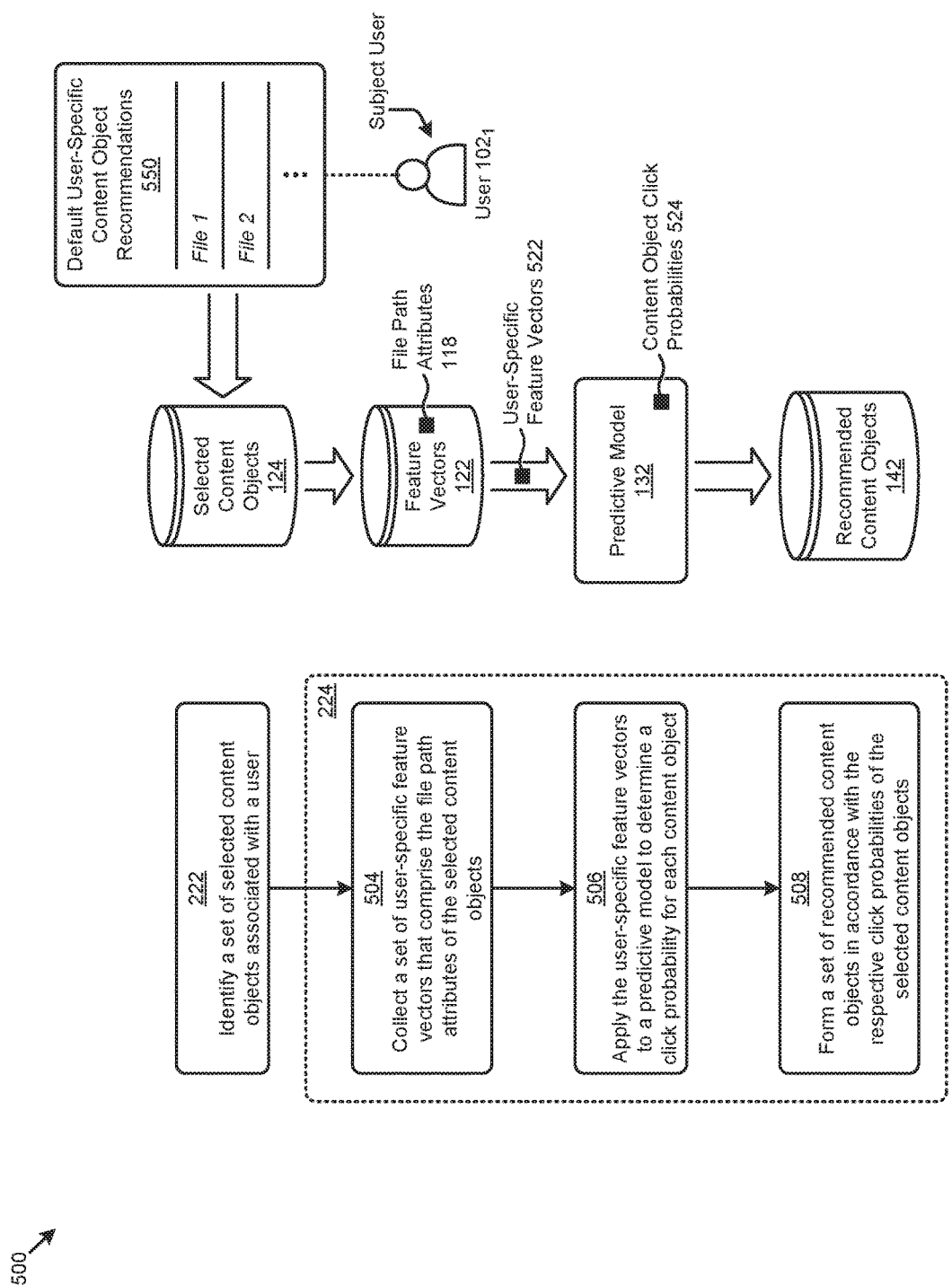
FIG. 5 presents a content object recommendation selection technique as implemented in systems that determine content object collaboration recommendations from file path information, according to an embodiment.

FIG. 5 presents a content object recommendation selection technique 500 as implemented in systems that determine content object collaboration recommendations from file path information. As an option, one or more variations of content object recommendation selection technique 500 or any aspect thereof may be implemented in the context of the architecture and functionality of the embodiments described herein. The content object recommendation selection technique 500 or any aspect thereof may be implemented in any environment.

FIG. 5 illustrates aspects pertaining to forming a predictive model from the file path information associated with historical content object access activity. Specifically, the figure is presented to illustrate one embodiment of certain steps and/or operations for applying the file path attributes of a set of content objects to a predictive model so as to determine a set of recommended content objects. As depicted in the figure, the steps and/or operations are associated with step 224 of FIG. 2. A representative scenario is also shown in the figure to illustrate an example application of content object recommendation selection technique 500.

Content object recommendation selection technique 500 commences upon identification of a set of content objects that are associated with a user (step 222). As illustrated, the set of content objects might be selected content objects 124 that are derived from a set of default user-specific content object recommendations 550 (e.g., File 1, File 2). Such a set of default user-specific content object recommendations might be established for a particular subject user (e.g., user $102_1$). As merely one example, selected content objects 124 might be selected by applying techniques that associate content objects with the subject user based at least in part on assumed shared interests between users. As earlier mentioned, application of such techniques may result in far too many content objects to be viewed by the subject user.

According to the content object recommendation selection technique 500 and/or other herein disclosed techniques, the set of selected content objects 124 can be reduced to one or more recommended content objects that the subject user is most likely (e.g., according to a quantitative probability) to have an interest in accessing. Specifically, a set of user-specific feature vectors that comprise the file path attributes of the selected content objects is collected (step 504). As shown, for example, a set of user-specific feature vectors 522 that comprises instances of file path attributes 118 that correspond to selected content objects 124 are extracted from feature vectors 122. The set of user-specific feature vectors are applied to a predictive model so as to determine the click probability for each of the selected content objects (step 506). As shown in the scenario of FIG. 5, user-specific feature vectors 522 are applied to predictive model 132 to determine a respective set of content object click probabilities 524 that correspond to selected content objects 124. A set of recommended content objects is then formed in accordance with the click probabilities associated with the content objects (step 508). As an example, the content objects from selected content objects 124 that have non-negligible click probabilities (e.g., greater than 5%) might comprise most or all of the recommended content objects 142.

Further details pertaining to techniques for processing the recommended content objects for presentation to a subject user (step 226 of FIG. 2) are disclosed as follows.

Figure 6:
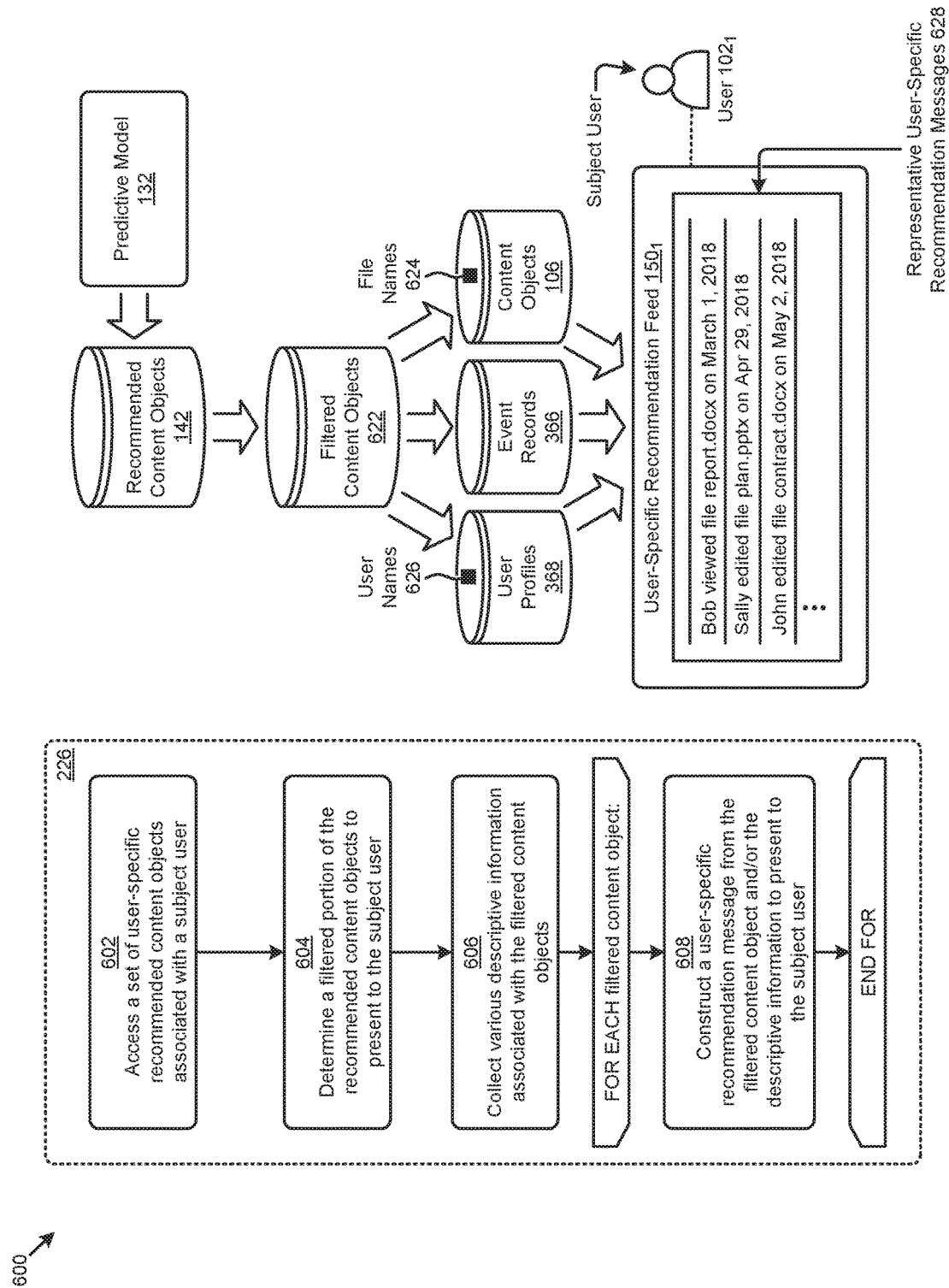
FIG. 6 illustrates a recommended content object processing technique as implemented in systems that determine content object collaboration recommendations from file path information, according to an embodiment.

FIG. 6 illustrates a recommended content object processing technique 600 as implemented in systems that determine content object collaboration recommendations from file path information. As an option, one or more variations of recommended content object processing technique 600 or any aspect thereof may be implemented in the context of the architecture and functionality of the embodiments described herein. The recommended content object processing technique 600 or any aspect thereof may be implemented in any environment.

FIG. 6 illustrates aspects pertaining to forming a predictive model from the file path information associated with historical content object access activity. Specifically, the figure is presented to illustrate one embodiment of certain steps and/or operations for processing recommended content objects for presentation to a subject user. As depicted in the figure, the steps and/or operations are associated with step 226 of FIG. 2. A representative scenario is also shown in the figure to illustrate an example application of recommended content object processing technique 600.

Recommended content object processing technique 600 commences by accessing a set of recommended content objects that are associated with a subject user (step 602). As an example, recommended content objects 142 for user 102₁ as determined at least in part by predictive model 132 in accordance with the herein disclosed techniques might be accessed. A filtered portion of the recommended content objects to present to the subject user is determined (step 604). As shown, the filtered portion of recommended content objects 142 constitutes a set of filtered content objects 622. In some cases, the content objects comprising filtered content objects 622 depend on the type of user device associated with the subject user. More specifically, the number of filtered content objects 622 may be proportional to the display area allocated to a user-specific recommendation feed at the user device (e.g., a smaller number of content objects for a smart phone and larger number of content objects for a laptop computer).

When the filtered content objects have been determined, various descriptive information pertaining to the content objects are collected (step 606). As an example, certain interaction attributes associated with user interaction events involving the filtered content objects 622 might be extracted from event records 366. Moreover, a set of file names 624 corresponding to filtered content objects 622 might be collected from content objects 106. Furthermore, a set of user names 626 of any users associated with the aforementioned user interaction events might be collected from user profiles 368.

For each filtered content object from the recommended content objects, a user-specific recommendation message is constructed from the filtered content object and/or the descriptive information associated with the filtered content object to present to the subject user (step 608). As illustrated by a set of representative user-specific recommendation messages 628 presented to user 102₁ in user-specific recommendation feed 150₁, the user-specific recommendation messages are human-readable messages derived from underlying content object and/or user interaction event information. The user-specific recommendation messages can be ordered in accordance with the click probability of the underlying content object of the messages so that the message displayed at the top of the feed has the highest likelihood (e.g., at least as pertains to its relative click probability) of being selected (e.g., "clicked") by the subject user. For example, the file "report.docx" presented at the top of user-specific recommendation feed 150₁ might be the content object that user 102₁ is predicted (e.g., based on the click probability associated with file "report.docx") to most likely access. In some cases, certain message construction logic and/or rules (e.g., for determining verb tense, preposition type and placement, date formatting, etc.) might be implemented to generate the messages.

Additional Embodiments of the Disclosure

Additional Practical Application Examples

Figure 7A:
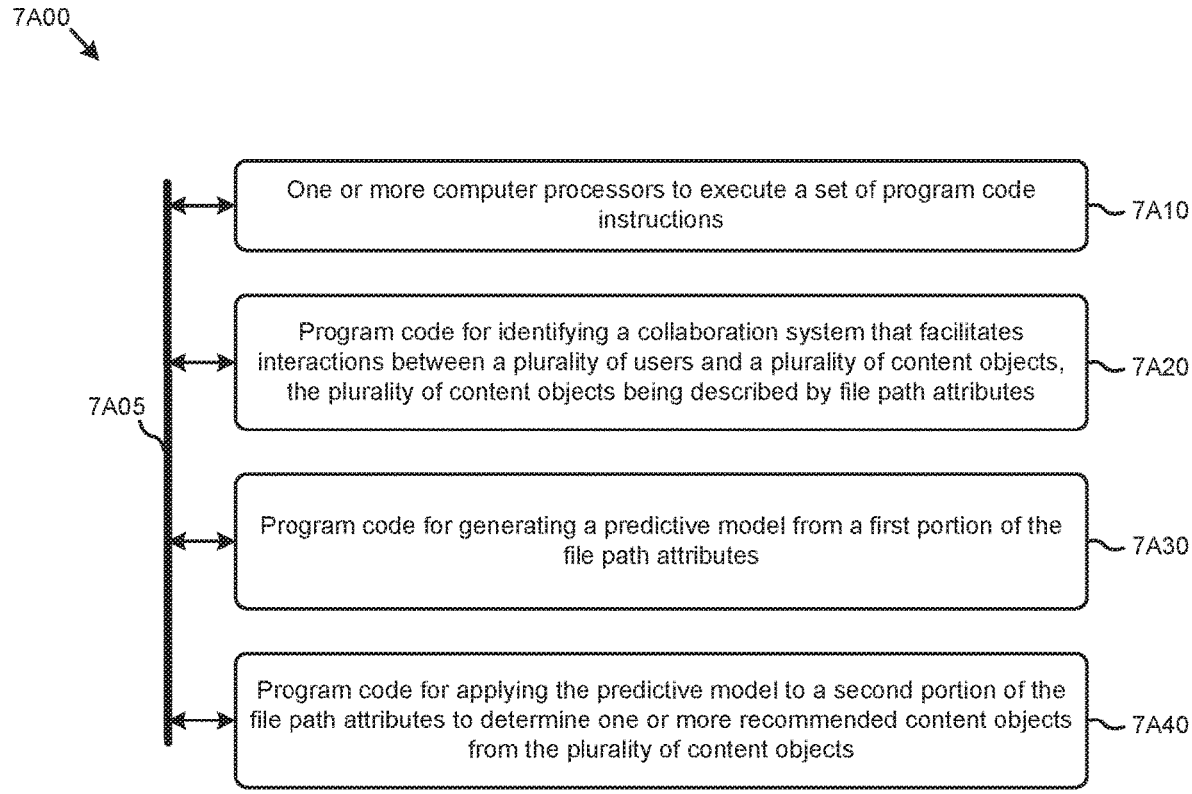
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address predicting a set of content objects that a user will most likely want to access. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying a collaboration system that facilitates interactions between a plurality of users and a plurality of content objects, the plurality of content objects being described by file path attributes (module 7A20); generating a predictive model from a first portion of the file path attributes (module 7A30); and applying the predictive model to a second portion of the file path attributes to determine one or more recommended content objects from the plurality of content objects (module 7A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
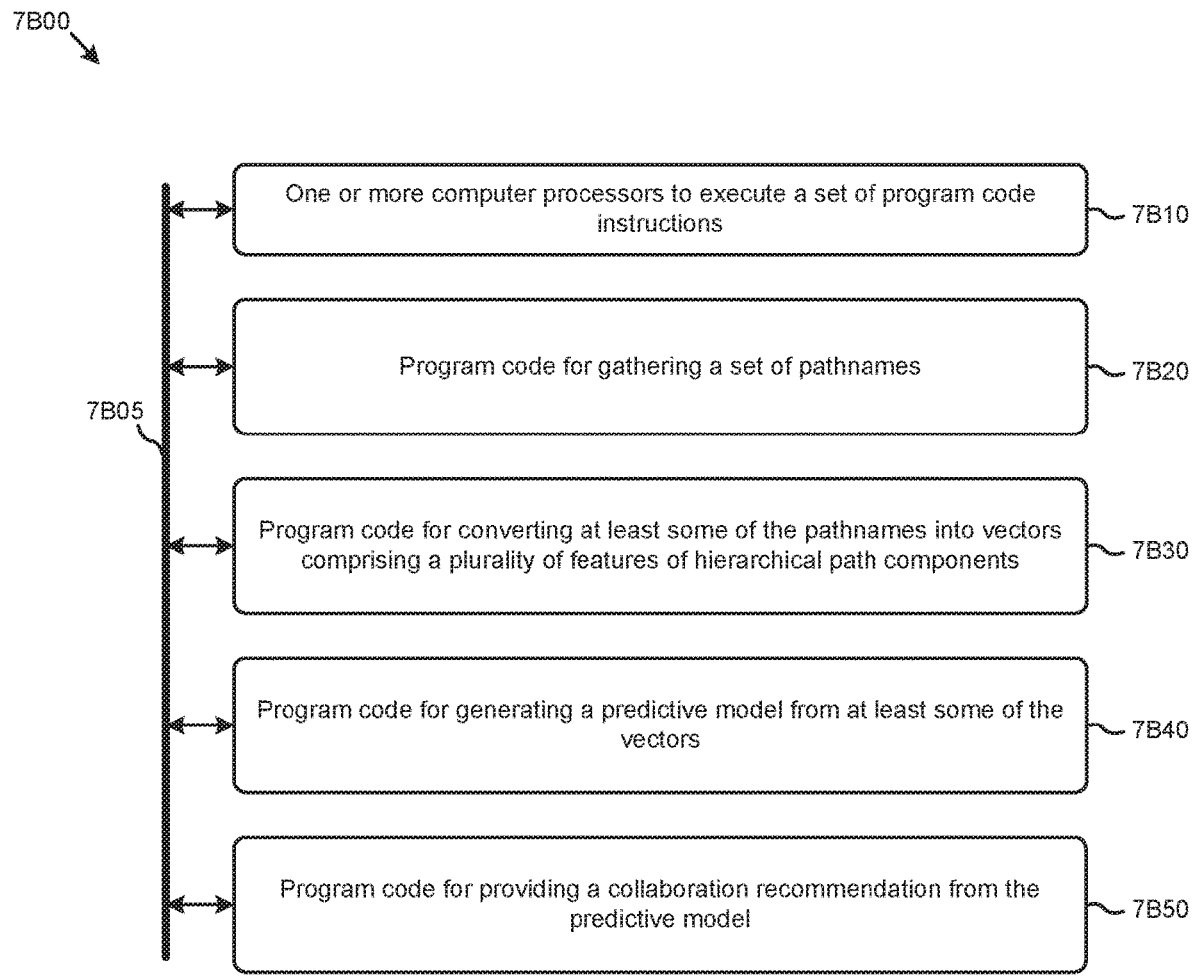

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment. The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims. The shown embodiment implements a portion of a computer system, presented as system 7B00, comprising one or more computer processors to execute a set of program code instructions (module 7B10) and modules for accessing memory to hold program code instructions to perform: gathering a set of pathnames (module 7B20); converting at least some of the pathnames into vectors comprising a plurality of features of hierarchical path components (module 7B30); generating a predictive model from at least some of the vectors (module 7B40); and providing a collaboration recommendation from the predictive model (module 7B50).

System Architecture Overview

Additional System Architecture Examples

Figure 8A:
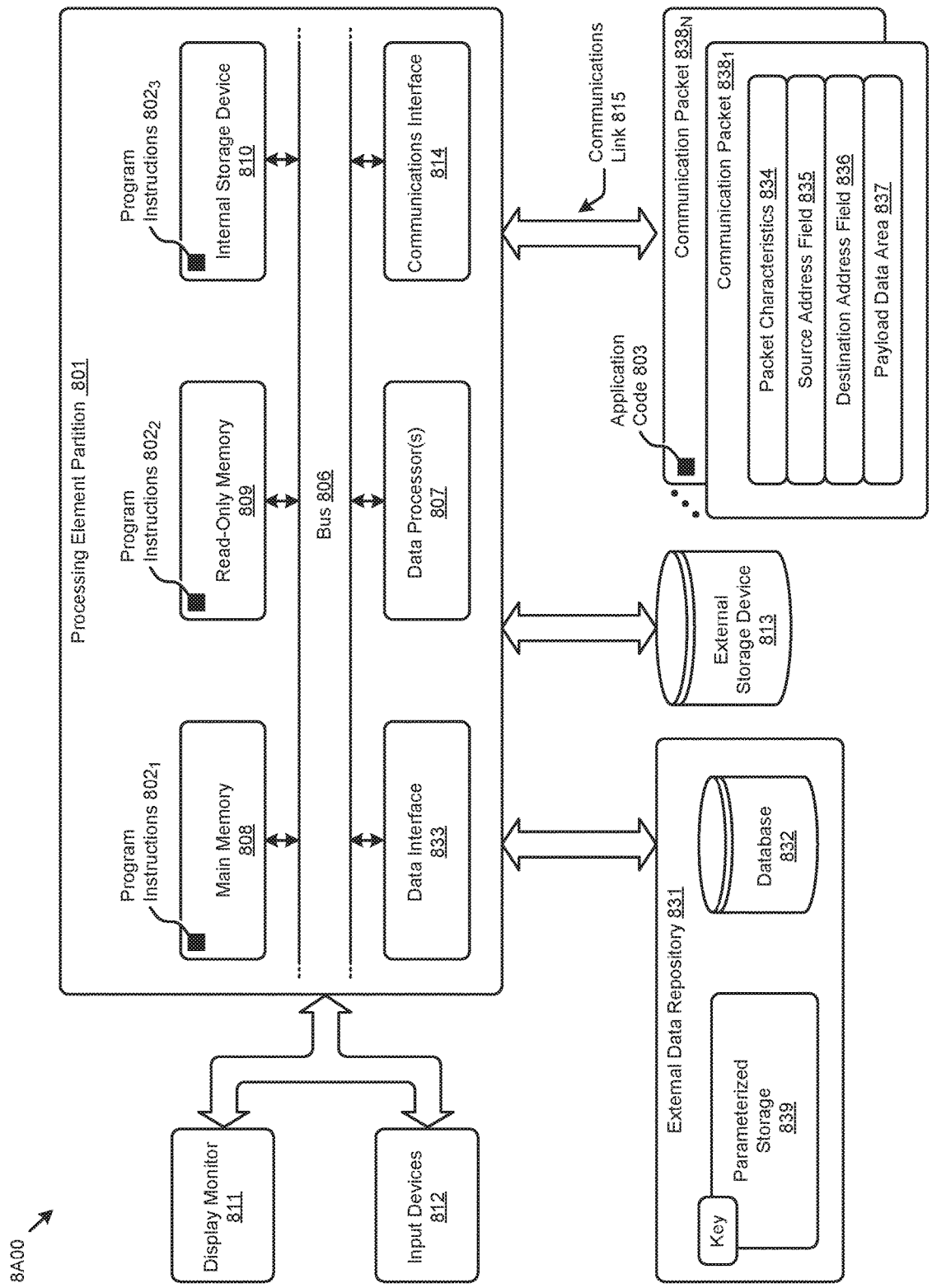
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to determining content object collaboration recommendations from file path information of content objects. A module may include one or more state machines and/or combinational logic used to implement or facilitate the operational and/or performance characteristics pertaining to determining content object collaboration recommendations from file path information of content objects.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of determining content object collaboration recommendations from file path information of content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to determining content object collaboration recommendations from file path information of content objects, and/or for improving the way data is manipulated when performing computerized operations pertaining to forming a predictive model from the file path information associated with historical content object access activity.

Figure 8B:
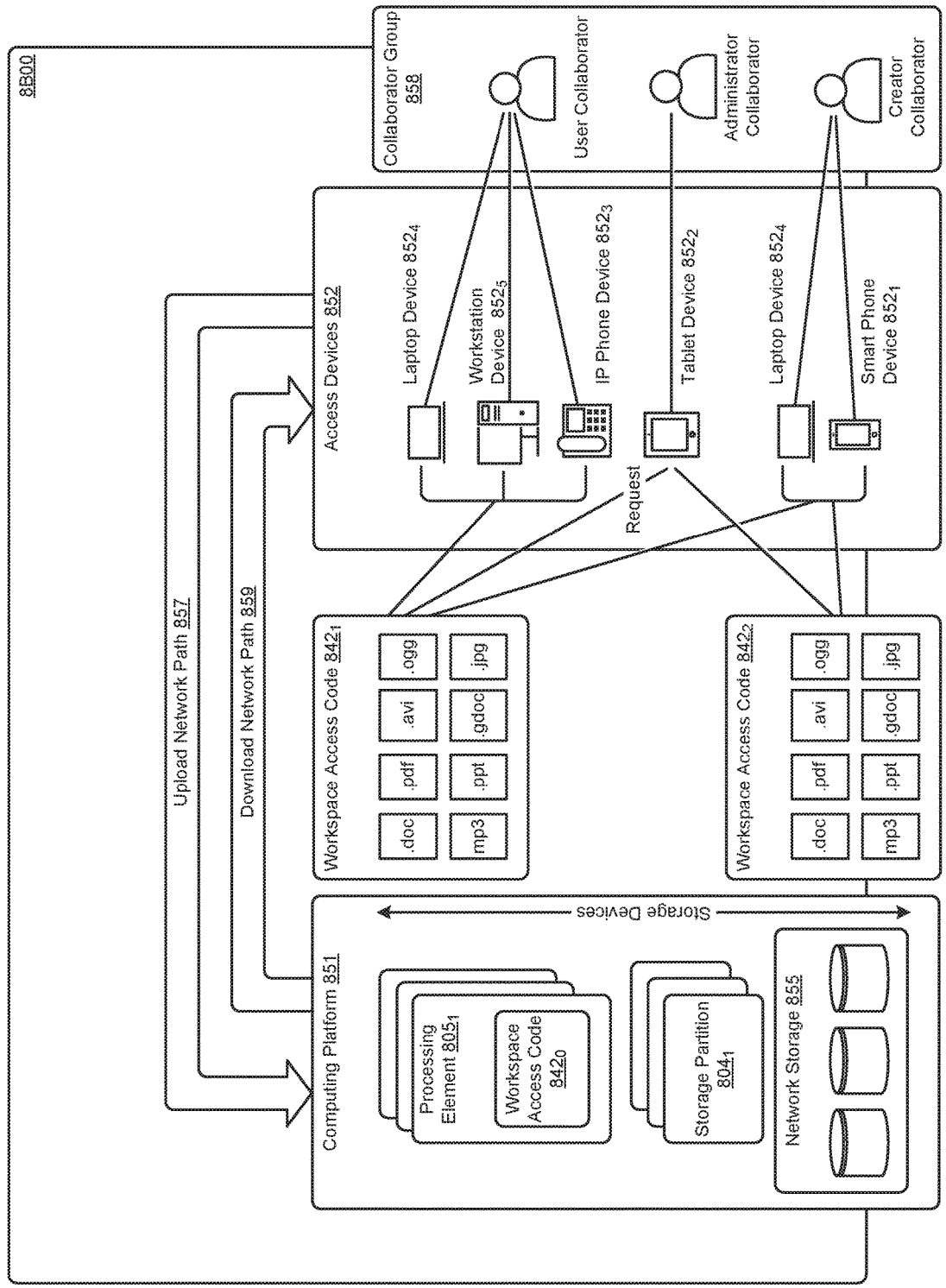

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for determining collaboration recommendations from file path information, the method comprising:
   gathering a set of pathnames of content objects in a collaboration platform;
   converting at least some of the set of pathnames of the content objects into vectors, wherein
      a vector includes both a directory hierarchy representation and an interaction attribute,
      the vectors are stored in a feature vector data structure,
      the feature vector data structure comprises a data record describing an object identifier of a content object of the content objects, a list of one or more users interacting with the content object, information of an interaction type for a pair of the content object and a user of the list of one or more users, and one or more attributes pertaining to the directory hierarchy representation,
      the directory hierarchy representation stored in the vector comprises a first file path token and a second file path token,
      the first file path token comprises at least a first name string representing a first hierarchy of a pathname associated with a directory hierarchy having multiple levels,
      the second file path token comprises at least a second name string representing a second hierarchy of the pathname associated with the directory hierarchy,
      the first hierarchy is located at a different level of the multiple levels from the second hierarchy in the directory hierarchy representation, and
      the interaction attribute represents an interaction event that corresponds to an operation that is observed to have been performed by a specific user or by a system for the specific user over a specific content object to indicate presence or absence of the interaction event between the specific user and the specific content object;
   generating a predictive model from at least some of the vectors and respective interaction attributes; and
   providing a recommended content object at least by providing an input pertaining to a plurality of content objects to the predictive model and at least by applying the predictive model to the input to determine one or more respective statistic measures pertaining to the plurality of content objects, wherein a collaboration recommendation pertaining to the recommended content object comprises at least one of a folder or a file.

2. The method of claim 1, further comprising:
   recording one or more interaction attributes that correspond to interaction events between users or operations performed by at least one of the users or by the system over one or more content objects of the plurality of content objects.

3. The method of claim 2, wherein the predictive model is generated based at least in part on the one or more interaction attributes.

4. The method of claim 1, wherein
   the directory hierarchy representation is codified in the vector,
   the pathname having a form "/A/B/" for the specific content object is tokenized such that a first sub-directory of the directory hierarchy "A" forms the first file path token, and a second sub-directory of the directory hierarchy "B" forms the second file path token of the vector for the specific content object.

5. The method of claim 4, wherein
   the vector is accessed to determine one or more recommended content objects comprising the recommended content object at least by determining, at the predicted model, one or more respective click probabilities of the one or more recommended content objects based at least in part upon the one or more attributes of respective pathnames of the one or more recommended content objects, and
   information pertaining to the one or more recommended content objects is ordered based at least in part upon the one or more respective click probabilities.

6. The method of claim 5, further comprising:
   processing the one or more recommended content objects, wherein processing the one or more recommended content objects comprises:
      determining a display area in a user interface of a user device for displaying at least the recommended content object; and
      filtering the one or more recommended content objects based at least in part upon the display area.

7. The method of claim 6, wherein processing the one or more recommended content objects includes at least one of scoring, sorting, ranking, filtering, decorating, or presenting the one or more recommended content objects.

8. The method of claim 7, further comprising:
   constructing one or more recommendation messages based at least in part on the one or more recommended content objects; and
   presenting the one or more recommendation messages at the user interface based at least in part upon the one or more respective click probabilities, wherein a same file in multiple different folders having multiple different pathnames have different click probabilities.

9. A non-transitory computer readable medium having stored thereon a sequence of instructions which, when stored in memory and executed by one or more processors causes the one or more processors to perform a set of acts for determining collaboration recommendations from file path information, the set of acts comprising:
   gathering a set of pathnames of content objects in a collaboration platform;
   converting at least some of the set of pathnames of the content objects into vectors, wherein
      a vector includes both a directory hierarchy representation and an interaction attribute,
      the vectors are stored in a feature vector data structure,
      the feature vector data structure comprises a data record describing an object identifier of a content object of the content objects, a list of one or more users interacting with the content object, information of an interaction type for a pair of the content object and a user of the list of one or more users, and one or more attributes pertaining to the directory hierarchy representation,
      the directory hierarchy representation stored in the vector comprises a first file path token and a second file path token,
      the first file path token comprises at least a first name string representing a first hierarchy of a pathname associated with a directory hierarchy having multiple levels, the second file path token comprises at least a second name string representing a second hierarchy of the pathname associated with the directory hierarchy, the first hierarchy is located at a different level of the multiple levels from the second hierarchy in the directory hierarchy representation, and the interaction attribute represents an interaction event that corresponds to an operation that is observed to have been performed by a specific user or by a system for the specific user over a specific content object to indicate presence or absence of the interaction event between the specific user and the specific content object;

generating a predictive model from at least some of the vectors and respective interaction attributes; and providing a recommended content object at least by providing an input pertaining to a plurality of content objects to the predictive model and at least by applying the predictive model to the input to determine one or more respective statistic measures pertaining to the plurality of content objects, wherein a collaboration recommendation pertaining to the recommended content object comprises at least one of a folder or a file.

10. The non-transitory computer readable medium of claim 9, further comprising instructions which, when stored in memory and executed by the one or more processors causes the one or more processors to perform acts of:

recording one or more interaction attributes that correspond to interaction events between users or operations performed by the specific user or by the system over one or more content objects.

11. The non-transitory computer readable medium of claim 10, wherein the predictive model is generated based at least in part on the interaction attributes.

12. The non-transitory computer readable medium of claim 10, wherein the directory hierarchy representation is codified in the vector, wherein the pathname having a form "/A/B/" for the content object is tokenized such that a first sub-directory of the directory hierarchy "A" forms the first file path token, and a second sub-directory of the directory hierarchy "B" forms the second file path token of the vector for the content object.

13. The non-transitory computer readable medium of claim 12, wherein the vectors are accessed to determine one or more recommended content objects comprising the recommended content object at least by determining, at the predicted model, one or more respective click probabilities of the one or more recommended content objects based at least in part upon one or more attributes of respective pathnames of the one or more recommended content objects, and information pertaining to the one or more recommended content objects is ordered based at least in part upon the one or more respective click probabilities.

14. The non-transitory computer readable medium of claim 13, further comprising instructions which, when stored in memory and executed by the one or more processors causes the one or more processors to perform acts of:

processing the one or more recommended content objects, wherein processing the one or more recommended content objects comprises: determining a display area in a user interface of a user device for displaying at least the recommended content object; and filtering the one or more recommended content object based at least in part upon the display area.

15. The non-transitory computer readable medium of claim 14, wherein processing the one or more recommended content objects includes at least one of scoring, sorting, ranking, filtering, decorating, or presenting the one or more recommended content objects.

16. The non-transitory computer readable medium of claim 15, further comprising instructions which, when stored in memory and executed by the one or more processors causes the one or more processors to perform acts of:

constructing one or more recommendation messages based at least in part on the one or more recommended content objects; and presenting the one or more recommendation messages at the user interface based at least in part upon the one or more respective click probabilities, wherein a same file in multiple different folders having multiple different pathnames have different click probabilities.

17. A system for determining collaboration recommendations from file path information, the system comprising:

a non-transitory storage medium having stored thereon a sequence of instructions; and one or more processors that execute the instructions to cause the one or more processors to perform a set of acts, the set of acts comprising, gathering a set of pathnames of content objects in a collaboration platform;

converting at least some of the set of pathnames of the content objects into vectors, wherein a vector includes both a directory hierarchy representation and an interaction attribute, the vectors are stored in a feature vector data structure, the feature vector data structure comprises a data record describing an object identifier of a content object of the content objects, a list of one or more users interacting with the content object, information of an interaction type for a pair of the content object and a user of the list of one or more users, and one or more attributes pertaining to the directory hierarchy representation, the directory hierarchy representation in the vector comprises a first file path token and a second file path token, the first file path token comprises at least a first name string representing a first hierarchy of a pathname associated with a directory hierarchy having multiple levels, the second file path token comprises at least a second name string representing a second hierarchy of the pathname associated with the directory hierarchy, the first hierarchy is located at a different level of the multiple levels from the second hierarchy in the directory hierarchy representation, and the interaction attribute represents an interaction event that corresponds to an operation that is observed to have been performed by a specific user or by a system for the specific user over a specific content object to indicate presence or absence of the interaction event between the specific user and the specific content object;

generating a predictive model from at least some of the vectors and respective interaction attributes; and providing a recommended content object at least by providing an input pertaining to a plurality of content objects to the predictive model and at least by applying the predictive model to the input to determine one or more respective statistic measures pertaining to the plurality of content objects, wherein a collaboration recommendation pertaining to the recommended content object comprises at least one of a folder or a file.

* * * * *